Figure 1:
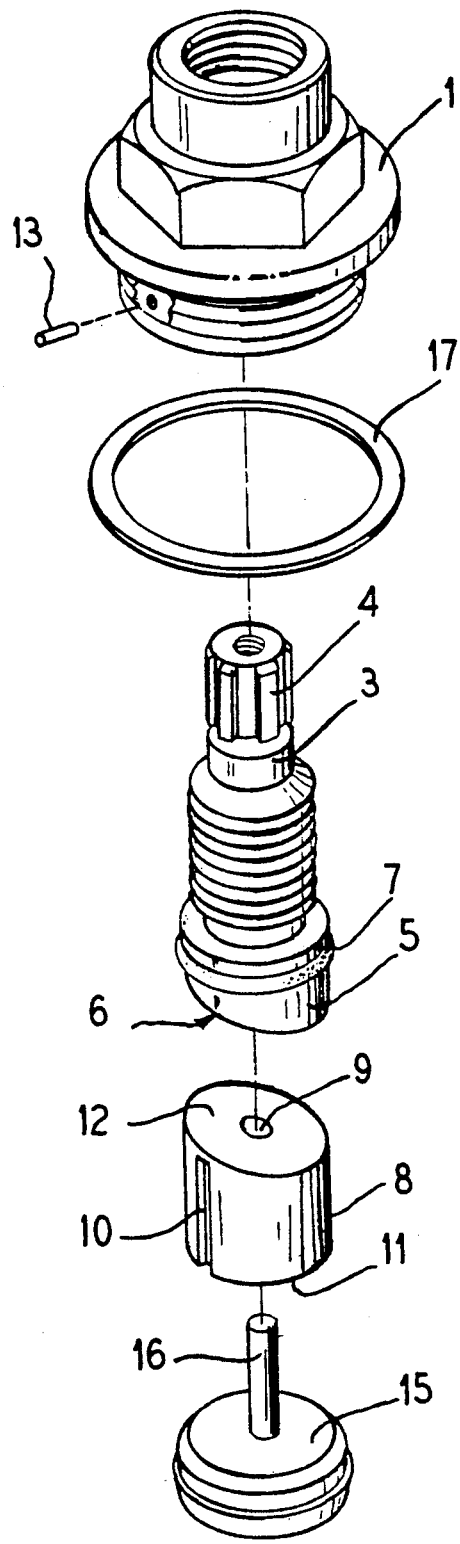

United States Patent [19]

Klicek et al.

[11] Patent Number: 5,273,255
[45] Date of Patent: Dec. 28, 1993

[54] QUARTER TURN TAP

[75] Inventors: Branko Klicek, Wetherill Park; Glenn J. Houston, Baulkham Hills, both of Australia

[73] Assignee: Caroma Industries Limited, Australia

[21] Appl. No.: 769,877

[22] Filed: Oct. 1, 1991

[30] Foreign Application Priority Data

Oct. 3, 1990 [AU] Australia ............... PK2623
Oct. 12, 1990 [AU] Australia ............... PK2791

[51] Int. Cl.$^5$ ............... F16K 1/02; F16K 31/50; F16K 31/524
[52] U.S. Cl. ............... 251/251; 74/55; 251/82; 251/262; 251/277
[58] Field of Search ............... 251/82, 83, 88, 251, 251/262, 263, 264, 277, 278; 74/25, 55, 89

[56] References Cited

U.S. PATENT DOCUMENTS

| | | | |
|---|---|---|---|
| 32,201 | 4/1861 | Neumann | 251/277 |
| 362,326 | 5/1887 | Smith | 251/82 |
| 1,069,876 | 8/1913 | Houser | 251/263 |
| 1,509,862 | 9/1924 | Edick | 137/244 |
| 1,627,486 | 5/1927 | Cravens | 251/278 |
| 1,705,139 | 3/1929 | Rigal | 251/263 |
| 2,099,992 | 11/1937 | Sutcliffe | 251/278 |
| 2,579,982 | 12/1951 | Trump | 251/256 |
| 3,408,040 | 10/1968 | Kraft | 251/82 |
| 3,897,042 | 7/1975 | Kachergis | 251/82 |
| 4,298,183 | 11/1981 | Kawakami | 251/263 |
| 4,634,093 | 1/1987 | Schintgen | 251/82 |
| 4,813,575 | 3/1989 | O'Connor | 251/82 |

FOREIGN PATENT DOCUMENTS

| | | |
|---|---|---|
| 2116030 | 10/1972 | Fed. Rep. of Germany ...... 251/263 |
| 2809600 | 9/1979 | Fed. Rep. of Germany . |
| 483015 | 7/1953 | Italy ............... 251/263 |
| 114730 | 8/1955 | New Zealand . |
| 117595 | 10/1956 | New Zealand . |
| 166612 | 3/1972 | New Zealand . |
| 096744 | 3/1977 | Taiwan . |
| 783780 | 10/1957 | United Kingdom ............... 251/278 |
| 1539065 | 1/1979 | United Kingdom . |
| 2188399 | 9/1987 | United Kingdom . |

*Primary Examiner*—George L. Walton
*Attorney, Agent, or Firm*—Hill, Steadman & Simpson

[57] ABSTRACT

A valve for use with a fluid tap is disclosed having a valve body (1), a handle spindle (3) which is termed to open and close a valve closure member (15). A valve carrier (8) is slidably mounted within the valve body (1) and includes an aperture (9) which receives a shaft (16) of the valve closure member (15). At least one of the handle spindle (3) and/or the valve carrier (8) is provided with a cammed surface (6,12) such that rotation of the handle spindle (3) through only fraction of a turn results in substantial longitudinal movement of the valve carrier (8), and subsequently, the valve closure member (15), relative to the valve body (1).

12 Claims, 2 Drawing Sheets

QUARTER TURN TAP

The present invention relates to tapware and, in particular to restricted turn tapware.

Conventional tapware requires that the handle and its accompanying spindle be rotated through several revolutions to enable the threaded handle spindle to longitudinally move to a degree sufficient to open or close the valve structure of the tap. The degree of longitudinal rotation depends upon the pitch of the threaded engagement between the handle spindle and the valve body. In some circumstances, the need to rotate the handle through several revolutions between full on and full off flow can be a disadvantage, particularly in public lavatories, and like public places, where members of the general public may be reluctant to, or simply lazy enough not to, turn a tap fully off. As a consequence, a very substantial volume of water can be wasted and this must be paid for by the authority providing the public convenience.

Quarter turn taps are known which utilize ceramic discs as the valve opening and closing mechanism. Such ceramic disc taps are relatively-expensive and suffer from a number of other operational disadvantages. In particular, they can sometimes lock up especially with high water pressures and are also subject to problems with grit or dirt being present in the water. Furthermore, often the maximum flow rate obtainable with the quarter turn tap utilizing a ceramic disc is substantially reduced relative to the flow rate of a conventional tap.

It has also been previously proposed to convert a conventional tap into a quarter turn tap simply by restricting the spindle to only a quarter turn by means of two bosses or like projections. This arrangement suffers from a number of disadvantages. In particular, the flow is substantially restricted because the valve washer is not lifted well clear of the valve seat in the maximum flow position. Furthermore, no allowance is made for wear of the valve washer and thus the movement permitted by the restricted quarter turn may not be sufficient to closingly seal a worn valve washer against the valve seat.

It is an object of the present invention to substantially overcome, or ameliorate, the abovementioned disadvantages by the provision of a reduced turn valve which preferably takes the form of a quarter turn water tap.

According to one aspect of the present invention there is disclosed a reduced turn valve for use with fluid taps, said valve comprising a valve body, a handle spindle mounted for threaded rotation relative to said valve body, and a valve carrier slidably mounted within said said valve body and shaped to receive a valve closure member, wherein at least one of said handle spindle and said valve carrier is provided with a cammed surface whereby rotation of said handle spindle through only a fraction of a turn results in substantial longitudinal movement of said valve carrier relative to said valve body. Preferably both the handle spindle and the valve carrier are cammed in opposite, or complementary senses. In addition, the cam surfaces are preferably provided with steps which restrict the permissible turning arc of the handle spindle.

Figure 2:
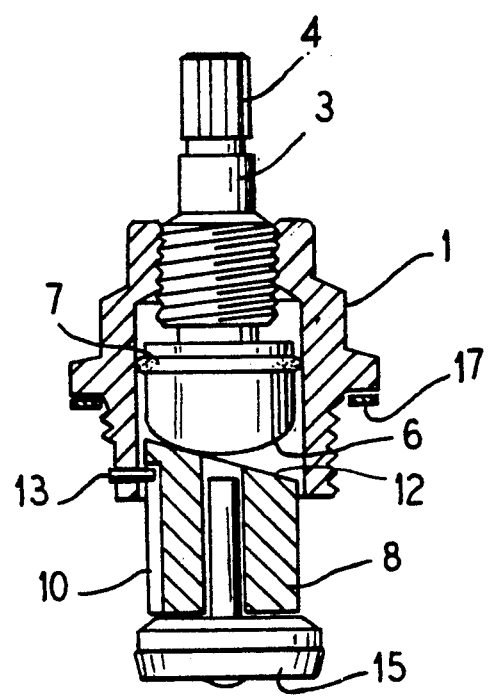
Figure 3:
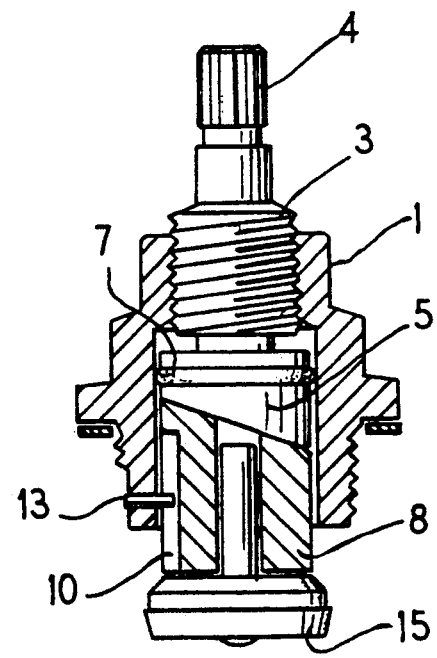
Figure 4:
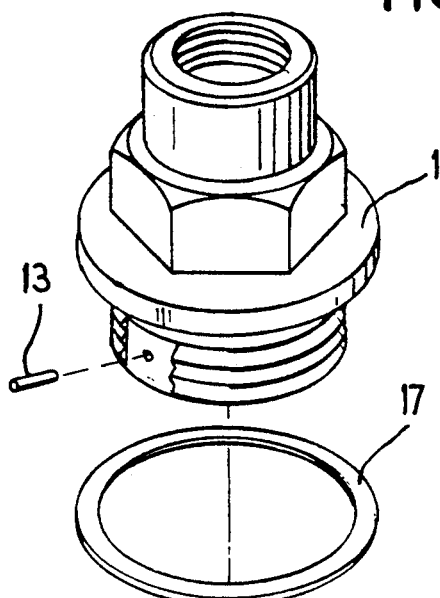
Figure 5:
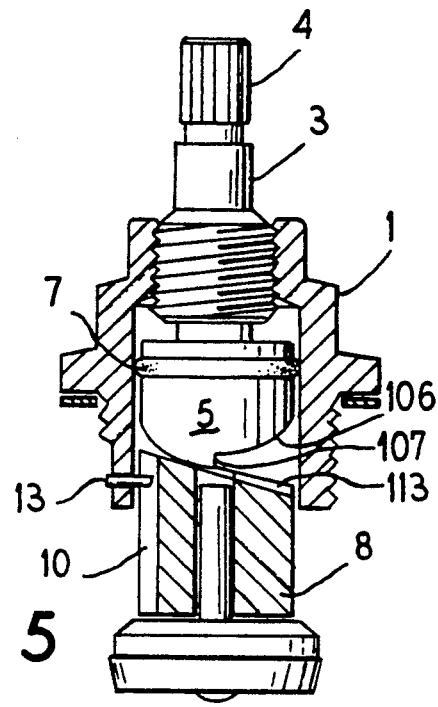
Figure 6:
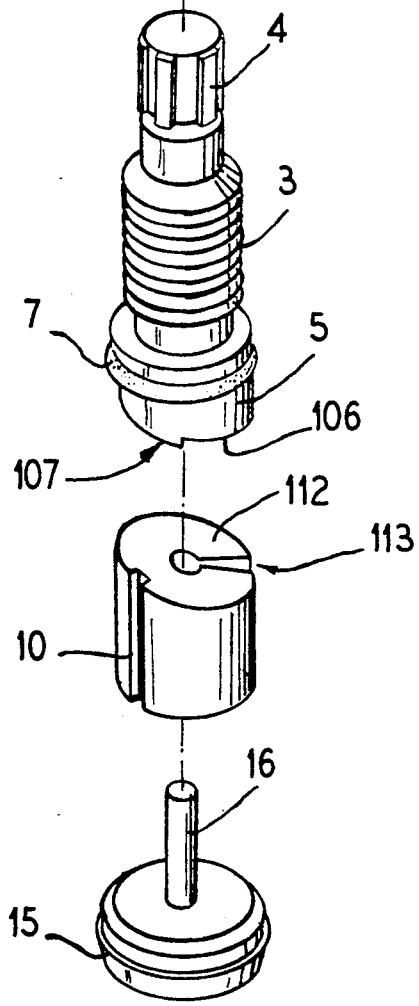
Figure 6:
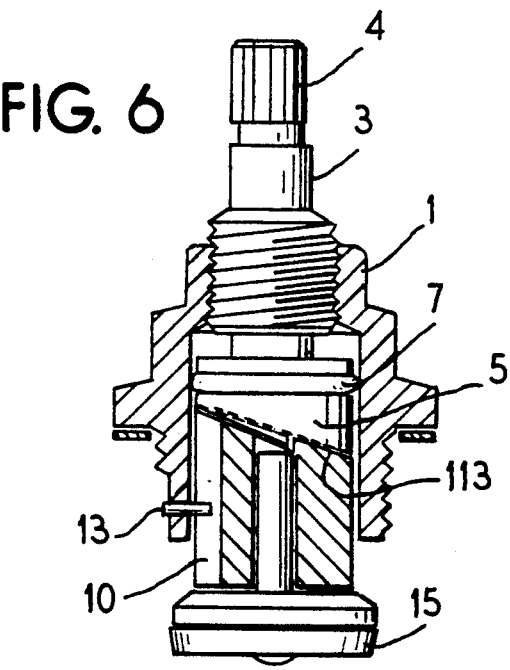

Two embodiments of the present invention will now be described with reference to the drawings in which:

FIG. 1 is an exploded perspective view of a simplified quarter turn tap construction in accordance with a first embodiment of the present invention, FIG. 2 is a longitudinal cross sectional view through the tap of FIG. 1 illustrating the closed position, FIG. 3 is a view similar to FIG. 2 but illustrating the tap open position, and FIGS. 4–6 are identical to those of FIGS. 1-3 but illustrating a second, preferred, embodiment.

As seen in FIGS. 1-3, the quarter turn tap of a simple embodiment of the present invention is made up from a substantially conventional valve body 1, which is able to be threadably engaged with a spindle 3. The spindle 3 at its upper end carries splines 4 which engage with a tap handle (not illustrated).

At the lower end of the spindle 3 is located a generally cylindrical body 5 which is cut at an angle of approximately 70° relative to the longitudinal axis of the spindle 4 in order to form an upper camming surface 6 which is elliptical when viewed in plan. The cylindrical body 5 rotates with the spindle 3 and carries an O-ring 7 which seals the spindle relative to the valve body 1.

Also located within the valve body 1 is a valve carrier 8 which has a central aperture 9 and a longitudinally extending slot 10. The valve carrier 8 is also of generally cylindrical configuration but has a lower surface 11 square to the carrier's longitudinal axis. The carrier 8 also has an inclined surface 12 which forms a lower camming surface and which, like the surface 6, is preferably inclined at an angle of approximately 70° to the longitudinal axis of the spindle 3 and forms an ellipse when viewed in plan.

The valve carrier 8 is able to slide within the valve body 1 but is prevented from rotation about the longitudinal axis of the spindle 3 by means of engagement of a pin 13 with the slot 10.

A conventional T-shaped tap washer 15 has its shaft 16 carried in the central aperture 9. The tap washer 15 is able to rotate relative to the valve carrier 8. A washer 17 which seals the valve body 1 against the conventional tap valve seat (not illustrated) completes the arrangement.

It will be apparent to those skilled in the art that the cylindrical body 5 and valve carrier 8 are notionally formed by cutting the conventional arrangement into two along a plane inclined at an angle of approximately 70° to the longitudinal axis of the spindle 3. The rotation of the spindle 3 can be restricted to only a quarter turn by any convenient means such as a protruding lug and a pair of cooperating bosses (not illustrated).

The operation of the tap construction of the first embodiment will now be described with reference to FIGS. 2 and 3. As seen in FIG. 3, the valve is shown in a maximum flow position. In this position water pressure acting against the tap washer 15 forces the valve carrier 8 to slide upwardly into the valve body 1. The upper and lower camming surfaces 6, 12 are in contact but the orientation of the spindle 3 relative to the valve carrier 8 permits the valve carrier 8 to slide into the valve body I to a maximum extent.

If now the spindle 3 is turned, the lower most portion of the upper camming surface 6 moves around the inclined surface 12 thereby forcing the valve carrier 8 downwardly as seen in FIG. 2 until, preferably, the maximum permitted movement of the pin 13 within the slot 10 is approached. Prior to reaching this maximum permitted longitudinal movement of the valve carrier 8 the tap washer 15 comes up hard against the conventional seat (not illustrated) to close the tap.

It will be apparent to those skilled in the art that the camming surfaces 6, 12 convert a quarter turn rotational movement of the spindle 3 into a very substantial longitudinal movement of the valve carrier 8. The same degree of longitudinal movement of the equivalent item of the conventional tap construction would only be achieved as a result of rotation of the spindle 3 through several revolutions.

A second embodiment of the present invention will now be described with reference to FIGS. 4–6 in which the arrangement is substantially as before, save that there is a modification to the upper and lower camming surfaces 6, 12. As best seen in FIG. 4, the lower camming surface is not formed as a plane but rather is formed as a spiral 112 having a small step 113. The upper camming surface 106 is likewise formed with a similar step 107.

As seen in FIGS. 5 and 6, the spirals 106 and 112 function in relation to the general opening and closing of the tap by converting rotational movement of the spindle 3 into longitudinal movement of the valve carrier 8 is as before. However, it will be appreciated that in moving from closed position illustrated in FIG. 5 into the maximum flow position illustrated in FIG. 6, the steps 107 and 113 abut each other thereby preventing further turning in the tap opening direction. This restricts the degree of rotation of the spindle 3 in that direction.

During tap closing, that is moving from the position illustrated in FIG. 6 into the position illustrated in FIG. 5, the longitudinal movement of the valve carrier 8, and hence the rotational movement of the spindle 3, is restricted only by the abutment of the washer 15 against the valve seat (not illustrated). As a consequence, any slight wear in the washer 15 is automatically compensated for by allowing further rotation of the spindle 3.

Experiments conducted to date using a water supply having a pressure of 200 kpa (30 psi) showed a flow rate of 28-29 liters/minute for a conventional tap requiring several turns to move between the tap closed and tap fully opened positions. When the same style of tap was modified in accordance with the present invention a maximum flow rate of 27 liters/minute was achieved with the same supply. This compares very favourably with conventional ceramic quarter turn taps which are only able to achieve maximum flow rates in the range of from 9 to 15 liters/minute for supplies of that order of pressure.

It will be apparent to those skilled in the art that the above described arrangement provides for a number of very substantial advantages. Firstly, the construction of the tap body is entirely conventional and thus of low cost. Furthermore, the production of the spindle 3 with its cylindrical body 5 and the valve carrier 8 are not unduly difficult and therefore are not expected to increase the production cost of the tap to any significant degree. Finally, low cost conventional tap washers 15 are able to be used again reducing the cost of the total arrangement and not providing any difficulties in relation to the provision of spare parts. Clearly, the major advantage to be obtained is that the tap is able to be opened between fully closed and fully on within approximately a quarter of a turn and that the full flow rate able to be achieved by a conventional tap set is also able to be achieved by the quarter turn tap.

The foregoing describes only two embodiments of the present invention and modifications, obvious to those skilled in the art, can be made thereto without departing from the scope of the present invention. For example, the slot 10 can be provided either with the configuration illustrated in FIGS. 1-3, or with the configuration illustrated in FIGS. 4–6.

We claim:

1. A reduced turn valve for use with liquid taps, said valve comprising a valve body, a handle spindle mounted for threaded rotation relative to said valve body, said handle spindle including a first cammed surface formed of a substantially inclined face at an end thereof within said valve body; an elongate valve carrier separate from, and independent of said handle spindle, said valve carrier having a longitudinal axis aligned with said handle spindle and being slidably mounted within said valve body and shaped to receive at one end thereof an independent and separate valve closure member freely reciprocally movable within said valve carrier, said valve carrier having a second cammed surface at the other end thereof, complementary to, and arranged to matingly engage said first cammed surface, and guide means configured for preventing rotation of said valve carrier about said longitudinal axis and for limiting a sliding and longitudinal movement thereof within said valve body, whereby rotation of said handle spindle through only a fraction of a turn results in said cammed surfaces interacting to cause substantial longitudinal sliding movement of said valve carrier relative to said valve body whereupon a reciprocable portion of said valve closure member will move within said valve carrier to cause an abutment portion of said valve closure member to abut said one end at different positions of said handle spindle to permit a certain flow rate of liquid at a particular position of said valve carrier until said valve carrier is moved to another position when said handle spindle is moved to another one of said different positions, and when said valve carrier is moved in a direction away from said handle spindle, at a predetermined position, said one end engages said abutment portion and said valve closure member is seated in said valve body to closure valve.

2. A valve as claimed in claim 1, wherein said cam surfaces are provided with steps which restrict a permissible turning arc of said handle spindle.

3. A valve as claimed in claim 1, wherein said means for preventing rotation comprises a longitudinally extending slot in said valve carrier and a pin transversely mounted in said valve body and extending into said slot.

4. A valve as claimed in claim 3, wherein said slot extends the length of said valve carrier.

5. A valve as claimed in claim 3, wherein said slot ends in an abutment surface at a location adjacent said cammed surface(s).

6. A valve as claimed in claim 1, wherein said valve carrier includes a central aperture adapted to receive a shaft of said valve closure member.

7. A valve as claimed in claim 6 wherein the valve closure member is freely rotatable within said aperture independent of movement of said handle spindle, or said valve carrier, or both.

8. A tap including a reduced turn valve as claimed in claim 1.

9. A reduced turn valve for use with fluid taps, said valve comprising:
a valve body;

a handle spindle mounted for threaded rotation relative to said body, said handle spindle including a first cammed surface formed of a substantially flat inclined face at one end thereof within said valve body; and an elongate valve carrier separate from, and independent of said handle spindle, said valve carrier slidably mounted within said valve body having a longitudinal axis aligned with said handle spindle, and having a central aperture at one end thereof shaped and adapted to receive a shaft of an independent and separate valve closure member and to permit free rotational and longitudinal movement of said valve closure member within said aperture, said valve carrier having a second cammed surface complementary to, and abutting, said first cammed surface, and a longitudinally extending slot extending the length of said carrier and into which extends a pin mounted transversely from said body to prevent rotation of said valve carrier; wherein rotation of said spindle causes said cammed surfaces to slide across each other to cause movement of said valve carrier along a rotational axis of said spindle causing substantial movement of said valve carrier relative to said valve body whereupon a reciprocable portion of said valve closure member will move within said valve carrier to cause an abutment portion of said valve closure member to abut said one end at different positions of said handle spindle to permit a certain flow of liquid until said valve carrier is moved to another position when said handle spindle is moved to another one of said different positions, and when said valve carrier is moved in a direction away from said handle spindle, at a predetermined position, said one end engages said abutment portion and said valve closure member is seated in said valve body to close said valve.

10. A valve as claimed in claim 8, wherein said first and second cammed surfaces are provided with steps which restrict a permissible turning arc of said handle spindle by said steps abutting together.

11. A valve as claimed in claim 9, wherein said slot ends in an abutment surface, abuttable by said pin, at a location adjacent said second cammed surface.

12. A reduced turn valve for use with fluid taps, said valve comprising:

a valve body;

a handle spindle mounted for threaded rotation relative to said valve body, said handle spindle including a first cammed surface formed of a substantially flat inclined face at one end thereof; and an elongate valve carrier separate from, and independent of said handle spindle, said valve carrier, and having a longitudinal axis aligned with said handle spindle, and slidably mounted within said valve body, and being shaped to receive at one end thereof an independent and separate valve closure member freely reciprocally movable within said valve carrier, said valve carrier having a second cammed surface complementary to, and matingly engaged to, said first cammed surface, and a longitudinally extending slot extending the length of said carrier and into which extends a pin mounted transversely from said body to prevent rotation of said valve carrier and to limit sliding movement of said valve carrier relative to said valve body; wherein rotation of said spindle causes said cammed surfaces to slide across each other to cause movement of said valve carrier along a rotational axis of said spindle causing substantial movement of said valve carrier relative to said valve body whereupon a reciprocable portion of said valve closure member will move within said valve carrier to cause an abutment portion of said valve closure member to abut said one end at different positions of said handle spindle to permit a certain flow rate of liquid corresponding to the longitudinal position of the valve carrier within the valve body until said valve carrier is moved to another position when said handle spindle is moved to another one of said different positions, and when said valve carrier is moved in a direction away from said handle spindle, at a predetermined position, said one end engages said abutment portion and said valve closure member is seated in said valve body to close said valve.

* * * * *